(12) United States Patent
Xiang et al.

(10) Patent No.: US 11,611,384 B2
(45) Date of Patent: *Mar. 21, 2023

(54) BEAM TRAINING BASED ON SIDELINK CONTROL INFORMATION AND CHANNEL STATE INFORMATION REFERENCE SIGNAL IN DEVICE-TO-DEVICE COMMUNICATIONS

(71) Applicant: Huawei Technologies Co., Ltd., Guangdong (CN)

(72) Inventors: Zhengzheng Xiang, Shanghai (CN); Jun Luo, Kista (SE); Hongjia Su, Shanghai (CN); Jinfang Zhang, Shenzhen (CN); Lei Lu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,534

(22) Filed: May 20, 2022

(65) Prior Publication Data

US 2022/0278734 A1    Sep. 1, 2022

Related U.S. Application Data

(63) Continuation of application No. 16/905,067, filed on Jun. 18, 2020, now Pat. No. 11,394,449, which is a
(Continued)

(30) Foreign Application Priority Data

Dec. 27, 2017 (CN) .......................... 201711455870.8

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04L 5/0048* (2013.01); *H04W 72/0406* (2013.01)

(58) Field of Classification Search
CPC ...... H04B 7/0695; H04B 7/063; H04B 7/088; H04L 5/0048; H04L 5/0094;
(Continued)

(56) References Cited

U.S. PATENT DOCUMENTS

2016/0269084 A1\*  9/2016  Nam .................... H04B 7/0417
2017/0026962 A1    1/2017  Liu et al.
(Continued)

FOREIGN PATENT DOCUMENTS

CN    106412947 A    2/2017
CN    106793092 A    5/2017
(Continued)

OTHER PUBLICATIONS

U.S. Appl. No. 62/443,291, filed Jan. 6, 2017 (Year: 2017).\*
(Continued)

*Primary Examiner* — Ian N Moore
*Assistant Examiner* — Sun Jong Kim
(74) *Attorney, Agent, or Firm* — Womble Bond Dickinson (US) LLP

(57) ABSTRACT

A beam training method and a related device are disclosed. The method includes: sending, by a first communications device, sidelink control information (SCI) to a second communications device, where the SCI is used to instruct the first communications device to send at least one channel state information-reference signal (CSI-RS) to the second communications device; and sending, by the first communications device, the at least one CSI-RS to the second communications device based on the SCI, where the at least one CSI-RS is used by the second communications device to
(Continued)

determine that a beam corresponding to a CSI-RS with highest signal strength in the at least one CSI-RS is a beam for communication between the second communications device and the first communications device. The CSI-RS used for beam training is dynamically sent based on the instruction of the SCI.

18 Claims, 6 Drawing Sheets

Related U.S. Application Data continuation of application No. PCT/CN2018/122750, filed on Dec. 21, 2018.

(51) Int. Cl.
*H04L 5/00* (2006.01)
*H04W 72/04* (2009.01)

(58) Field of Classification Search
CPC .......... H04W 72/0406; H04W 72/085; H04W 72/0413; H04W 72/042; H04W 72/046; H04W 76/14
See application file for complete search history.

(56) References Cited

U.S. PATENT DOCUMENTS

| | | |
|---|---|---|
| 2017/0033912 A1 | 2/2017 | Onggosanusi et al. |
| 2017/0048734 A1 | 2/2017 | Kusashima et al. |
| 2018/0152949 A1 | 5/2018 | Guo et al. |
| 2018/0198583 A1* | 7/2018 | Lin ........................ H04L 5/0094 |
| 2018/0234220 A1* | 8/2018 | Yasukawa .............. H04L 5/0042 |
| 2018/0270812 A1* | 9/2018 | Lee ................... H04W 72/0406 |
| 2019/0089442 A1* | 3/2019 | Akoum ................ H04B 7/0639 |
| 2020/0389220 A1 | 12/2020 | Kang et al. |
| 2021/0242988 A1 | 8/2021 | Kwak et al. |

FOREIGN PATENT DOCUMENTS

| | | |
|---|---|---|
| CN | 107079437 A | 8/2017 |
| CN | 107360625 A | 11/2017 |
| RU | 2120180 C1 | 10/1998 |
| RU | 2585309 C2 | 5/2016 |
| RU | 2638777 C2 | 12/2017 |
| WO | 9639748 A1 | 12/1996 |
| WO | 2016163972 A1 | 10/2016 |
| WO | 2017012472 A1 | 1/2017 |
| WO | 2017026477 A1 | 2/2017 |
| WO | 2017091123 A1 | 6/2017 |
| WO | 2017135737 A1 | 8/2017 |
| WO | 2017193773 A1 | 11/2017 |
| WO | WO-2017193773 A1 * | 11/2017 |

OTHER PUBLICATIONS

English translation copy of WO-2017193773 (Year: 2017).*
3GPP TSG RAN WG1 Meeting #85,R1-165067:"Contents of SCI for V2V communication",Potevio,Nanjing,China May 23-27, 2016,total 3 pages.

* cited by examiner

BEAM TRAINING BASED ON SIDELINK CONTROL INFORMATION AND CHANNEL STATE INFORMATION REFERENCE SIGNAL IN DEVICE-TO-DEVICE COMMUNICATIONS

CROSS-REFERENCE TO RELATED APPLICATIONS

This application is a continuation of U.S. patent application Ser. No. 16/905,067, filed on Jun. 18, 2020, which is a continuation of International Application No. PCT/CN2018/122750, filed on Dec. 21, 2018, which claims priority to Chinese Patent Application No. 201711455870.8, filed on Dec. 27, 2017. All of the afore-mentioned patent applications are hereby incorporated by reference in their entireties.

TECHNICAL FIELD

The present disclosure relates to the field of wireless communications technologies, and in particular, to a beam training method and a related device.

BACKGROUND

Wireless communications technologies have experienced rapid development over the past decades, and has experienced a 1st generation wireless communications system based on an analog communications system, a 2nd generation (2G) wireless communications system represented by a global system for mobile communications (GSM), a 3G wireless communications system represented by wideband code division multiple access (WCDMA), and then a 4G wireless communications system that has been widely put into commercial use and has achieved great success in the world and that is represented by long term evolution (LTE). Services supported by the wireless communications system are also developed from an initial voice and short message to currently supported wireless high-speed data communication. At the same time, a quantity of wireless connections in the world continuously increases at a high speed, and various new wireless service types also emerge greatly, for example, the internet of things and self-driving. These raise a higher requirement on a next generation 5G wireless communications system.

Vehicle-to-vehicle (V2V) communication may be considered as a special case of device-to-device (D2D) communication. Through direct communication between vehicles, status information and a road condition of another vehicle can be obtained in real time, to better assist vehicle driving or even implement self-driving. FIG. 1 is a schematic diagram of a V2V communication scenario according to a prior-art solution. A running vehicle may directly communicate with another nearby vehicle through V2V communication. Before direct communication is performed between the vehicles, a beam used for communication between the vehicles needs to be determined through beam training, to better resist fading of a high-frequency signal. However, in the prior art, beam training is performed between a base station and a communications device, and a beam training reference signal is semi-statically configured by the base station by using RRC signaling. This lacks flexibility, and efficiency of beam training is not high.

SUMMARY

Embodiments of the present disclosure provide a beam training method and a related device, to improve flexibility of beam training and efficiency of beam training.

According to a first aspect, an embodiment of the present disclosure provides a beam training method. The method includes:

first sending, by a first communications device, sidelink control information (SCI) to a second communications device, where the SCI is used to instruct the first communications device to send at least one channel state information-reference signal (CSI-RS) to the second communications device; and then sending the at least one CSI-RS to the second communications device based on the SCI, where the at least one CSI-RS is used by the second communications device to determine that a beam corresponding to a CSI-RS with highest signal strength in the at least one CSI-RS is a beam for communication between the second communications device and the first communications device. The CSI-RS used for beam training is dynamically sent based on the instruction of the SCI, and therefore, flexibility and efficiency of beam training are improved.

In one embodiment, the first communications device receives feedback information sent by the second communications device. The feedback information includes at least one of an identifier of the beam corresponding to the CSI-RS with the highest signal strength and a resource identifier of the CSI-RS with the highest signal strength. Therefore, the first communications device may determine a beam with highest signal strength, and communicate with the second communications device by using the beam with the highest signal strength.

In another embodiment, the SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS. The scheduling indication of the CSI-RS may be 1-bit information, and is used to notify the second communications device that the CSI-RS is currently scheduled.

In another embodiment, the SCI includes a time offset K, the time offset K is used to instruct the second communications device to send the feedback information in a $K^{th}$ subframe after a subframe in which the CSI-RS is received, and K is an integer greater than or equal to 0, so that proper resource scheduling is implemented.

In another embodiment, the SCI includes first indication information, and the first indication information is used to instruct the second communications device to send the feedback information on a time-frequency resource in the $K^{th}$ subframe, to better implement resource multiplexing.

In another embodiment, the CSI-RS is further used for channel measurement, the SCI includes second indication information, and the second indication information is used to indicate that the CSI-RS is used for at least one of channel measurement and beam training.

In another embodiment, the SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device. The configuration information of the CSI-RS may be sent by the base station to the first communications device by using radio resource control (RRC) signaling.

In another embodiment, the first communications device and the second communications device apply wide beam alignment, each wide beam includes a plurality of narrow beams, and the first communications device separately sends CSI-RSs to the second communications device by using a plurality of narrow beams in a same wide beam. Transmit directions of the plurality of narrow beams are different, so that when the second communications device receives each narrow beam, signal strength of the beam or signal strength of a CSI-RS corresponding to the beam may be different. After receiving the plurality of narrow beams, the second communications device may determine a beam with highest signal strength or a CSI-RS with highest signal strength.

According to a second aspect, an embodiment of the present disclosure provides a beam training method. The method includes:

first receiving, by a second communications device, sidelink control information (SCI) sent by a first communications device, where the SCI is used to instruct the first communications device to send at least one channel state information-reference signal (CSI-RS) to the second communications device; then receiving, based on the SCI, the at least one channel state information-reference signal (CSI-RS) sent by the first communications device; and finally determining that a beam corresponding to a CSI-RS with highest signal strength in the at least one CSI-RS is a beam for communication between the second communications device and the first communications device. The CSI-RS used for beam training is dynamically received based on the instruction of the SCI, and therefore, flexibility and efficiency of beam training are improved.

In one embodiment, the second communications device sends feedback information to the first communications device. The feedback information includes at least one of an identifier of the beam corresponding to the CSI-RS with the highest signal strength and a resource identifier of the CSI-RS with the highest signal strength. Therefore, the first communications device may determine, based on the feedback information, a beam with highest signal strength, and communicate with the second communications device by using the beam with the highest signal strength.

In another embodiment, the SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS.

In another embodiment, if the SCI includes a time offset K, the second communications device may send, based on the time offset K, the feedback information to the first communications device in a $K^{th}$ subframe after a subframe in which the CSI-RS is received, to implement proper resource scheduling.

In another embodiment, if the SCI includes first indication information, the second communications device may send, based on the first indication information, the feedback information to the first communications device on a time-frequency resource in the $K^{th}$ subframe, to better implement resource multiplexing.

In another embodiment, the CSI-RS may be used for beam training, or may be used for channel measurement. If the received SCI includes second indication information, the second communications device may determine, based on the second indication information, whether the CSI-RS is used for channel measurement, beam training, or both channel measurement and beam training. If the CSI-RS is used for channel measurement, a rank, a channel gain, a channel direction, and the like of a channel are measured based on the CSI-RS.

In another embodiment, the SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device.

According to a third aspect, an embodiment of the present disclosure provides a first communications device. The first communications device is configured to implement the method and a function that are performed by the first communications device in the first aspect, and is implemented by hardware/software. The hardware/software includes a unit corresponding to the foregoing function.

According to a fourth aspect, an embodiment of the present disclosure provides a second communications device. The second communications device is configured to implement the method and a function that are performed by the second communications device in the second aspect, and is implemented by hardware/software. The hardware/software includes a unit corresponding to the foregoing function.

According to a fifth aspect, an embodiment of the present disclosure provides another first communications device, including a processor, a memory, and a communications bus. The communications bus is configured to implement a connection and communication between the processor and the memory, and the processor executes a program stored in the memory to implement an operation in the beam training method provided in the first aspect.

In one embodiment, the first communications device provided in the present disclosure may include a corresponding module configured to perform behavior of the first communications device in the foregoing method design. The module may be software and/or hardware.

According to a sixth aspect, an embodiment of the present disclosure provides a second communications device, including a processor, a memory, and a communications bus. The communications bus is configured to implement a connection and communication between the processor and the memory, and the processor executes a program stored in the memory to implement an operation in the beam training method provided in the second aspect.

In one embodiment, the second communications device provided in this embodiment of the present disclosure may include a corresponding module configured to perform behavior of the second communications device in the foregoing method design. The module may be software and/or hardware.

According to a seventh aspect, an embodiment of the present disclosure provides a computer-readable storage medium. The computer-readable storage medium stores an instruction, and when the instruction is run on a computer, the computer is enabled to perform the method in the foregoing aspects.

According to an eighth aspect, an embodiment of the present disclosure provides a computer program product including an instruction. When the computer program product is run on a computer, the computer is enabled to perform the method in the foregoing aspects.

BRIEF DESCRIPTION OF DRAWINGS

To describe technical solutions in embodiments of the present disclosure or in the background more clearly, the following describes the accompanying drawings required for describing the embodiments of the present disclosure or the background.

DESCRIPTION OF EMBODIMENTS

The following describes embodiments of the present disclosure with reference to the accompanying drawings in the embodiments of the present disclosure.

Figure 1:
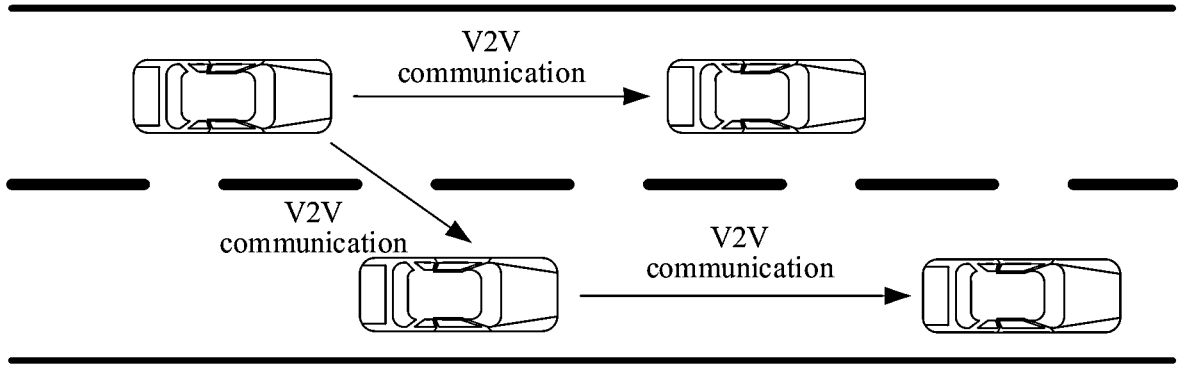
FIG. 1 is a schematic diagram of a V2V communication scenario according to a prior-art solution.
Figure 2:
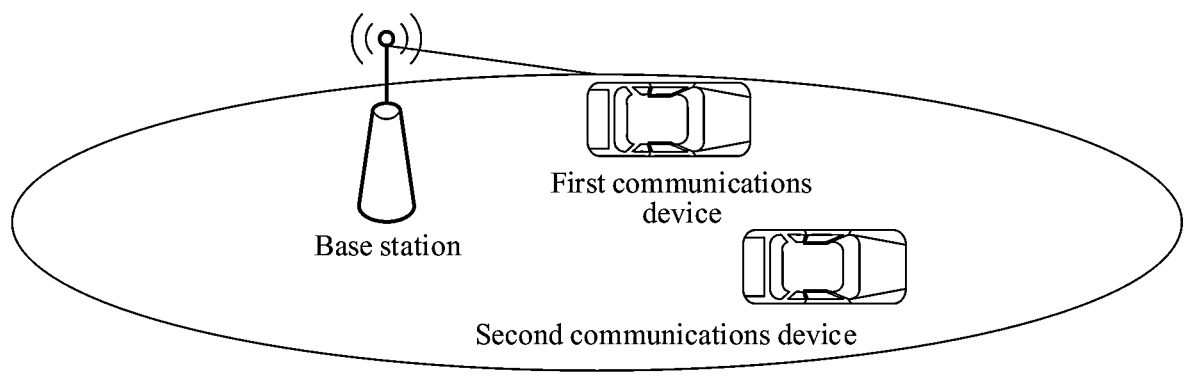
FIG. 2 is a schematic structural diagram of a wireless communications system according to an embodiment of the present disclosure.

FIG. 2 is a schematic structural diagram of a wireless communications system according to an embodiment of the present disclosure. The wireless communications system includes a first communications device, a second communications device, and a base station. The first communications device may directly communicate with the second communications device, or may communicate with the second communications device by using the base station. The first communications device or the second communications device may be a device that provides a voice and/or a data connection to a user, may be connected to a computing device such as a laptop computer or a desktop computer, or may be an independent device such as a personal digital assistant (PDA). The first communications device or the second communications device may be user equipment (UE), for example, a vehicle, a subscriber unit, a subscriber station, a mobile station, a mobile console, a remote station, an access point, a remote terminal, an access terminal, a user terminal, a user agent, or a user apparatus. The first communications device or the second communications device may alternatively be a chip, for example, a processor. The base station may be an access point, a NodeB, an evolved NodeB (eNB), or a 5G base station (Next generation base station, gNB), and is a device in an access network that communicates with a wireless terminal by using one or more sectors on an air interface. By converting a received air interface frame into an IP packet, the base station may serve as a router between the wireless terminal and another part of the access network, and the access network may include an internet protocol network. The base station may further coordinate attribute management for the air interface.

Based on the foregoing wireless communications system, LTE V2V communication includes two communication modes. A first communication mode is V2V communication scheduled by a base station, and a V2V communications device may send a control message and data that are of the V2V communication on a scheduled time-frequency resource based on scheduling information of the base station. In a second communication mode, a V2V communications device selects, by itself from available time-frequency resources included in a V2V communications resource pool, a time-frequency resource used for communication, and sends a control message and data on the selected time-frequency resource. The two communication modes have their own advantages and disadvantages and can be flexibly applied to various scenarios.

Figure 3:
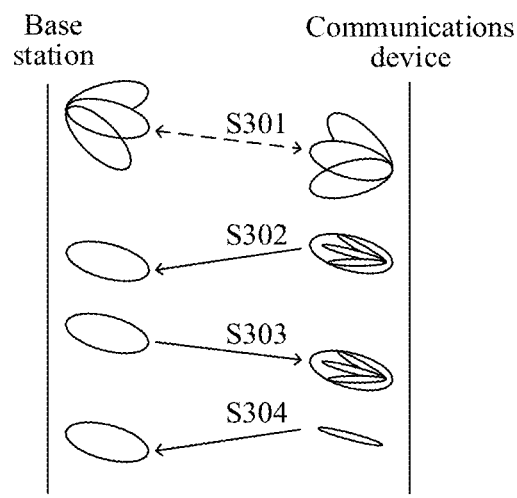
FIG. 3 is a schematic diagram of a beam training method according to an embodiment of the present disclosure.

FIG. 3 is a schematic diagram of a beam training method according to an embodiment of the present disclosure. In the method, beam training is performed between a base station and a communications device, to determine a beam used for communication between communications devices. The method includes: S301: A base station and a communications device apply wide beam alignment. In FIG. 3, there is a correspondence between three wide beams (a wide beam 1, a wide beam 2, and a wide beam 3) of the communications device and three wide beams of the base station, and each wide beam includes at least one narrow beam. S302: The communications device separately sends, to the base station by using a plurality of narrow beams included in the wide beam 2, reference signals used for beam training. S303: After receiving the reference signals that are separately sent by the communications device by using the plurality of narrow beams, the base station determines a narrow beam with highest signal strength in the plurality of narrow beams, and then sends indication information to the communications device, where the indication information is used to indicate the narrow beam with the highest signal strength. S304: After receiving the indication information sent by the base station, the communications device selects the narrow beam with the highest signal strength, to communicate with the base station. However, the method is applied to beam training between the base station and the communications device, and the base station periodically sends a reference signal through RRC signaling semi-static configuration. This lacks flexibility, and efficiency of beam training is not high. To resolve the foregoing problems, the embodiments of the present disclosure provide the following solutions.

Figure 4:
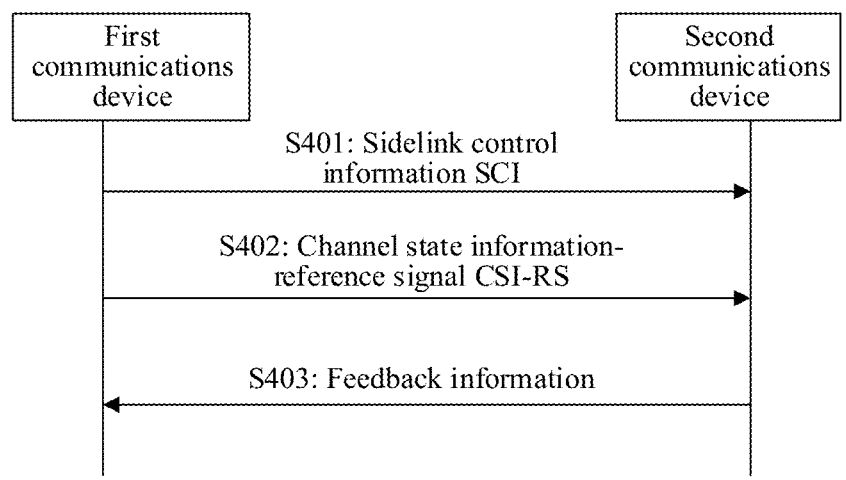
FIG. 4 is a schematic flowchart of a beam training method according to an embodiment of the present disclosure.

FIG. 4 is a schematic flowchart of a beam training method according to an embodiment of the present disclosure. The method includes but is not limited to the following operations.

Operation S401: A first communications device sends sidelink control information (SCI) to a second communications device, where the SCI is used to instruct the first communications device to send at least one channel state information-reference signal (CSI-RS) to the second communications device.

During specific implementation, when it is detected that the first communications device needs to communicate with the second communications device and needs to perform beam training with the second communications device, the first communications device generates the CSI-RS used for beam training. Before sending the CSI-RS to the second communications device, the first communications device may send the SCI to the second communications device, and the SCI is used to instruct the second communications device to receive the CSI-RS sent by the first communications device. The SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS. The scheduling indication of the CSI-RS may be 1-bit information, and is used to notify the second communications device that the CSI-RS is currently scheduled.

In one embodiment, the SCI includes a time offset K, the time offset K is used to instruct the second communications device to send the feedback information in a $K^{th}$ subframe after a subframe in which the CSI-RS is received, and K is an integer greater than or equal to 0. Therefore, proper resource scheduling is implemented.

In one embodiment, the SCI includes first indication information, and the first indication information is used to instruct the second communications device to send the feedback information on a time-frequency resource in the $K^{th}$ subframe, to better implement resource multiplexing.

In one embodiment, the CSI-RS is further used for channel measurement, the SCI includes second indication information, and the second indication information is used to indicate that the CSI-RS is used for at least one of channel measurement and beam training.

In one embodiment, the SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device. The configuration information of the CSI-RS may be sent by the base station to the first communications device by using radio resource control (RRC) signaling.

Operation S402: The first communications device sends the at least one CSI-RS to the second communications device based on the SCI, where the at least one CSI-RS is used by the second communications device to determine that a beam corresponding to a CSI-RS with highest signal strength in the at least one CSI-RS is a beam for communication between the second communications device and the first communications device.

During specific implementation, the first communications device and the second communications device apply wide beam alignment, each wide beam includes a plurality of narrow beams, and the first communications device separately sends CSI-RSs to the second communications device by using a plurality of narrow beams in a same wide beam. Transmit directions of the plurality of narrow beams are different, so that when the second communications device receives each narrow beam, signal strength of the beam or signal strength of a CSI-RS corresponding to the beam may be different. After receiving the plurality of narrow beams, the second communications device may determine a beam with highest signal strength or a CSI-RS with highest signal strength.

Figure 5:
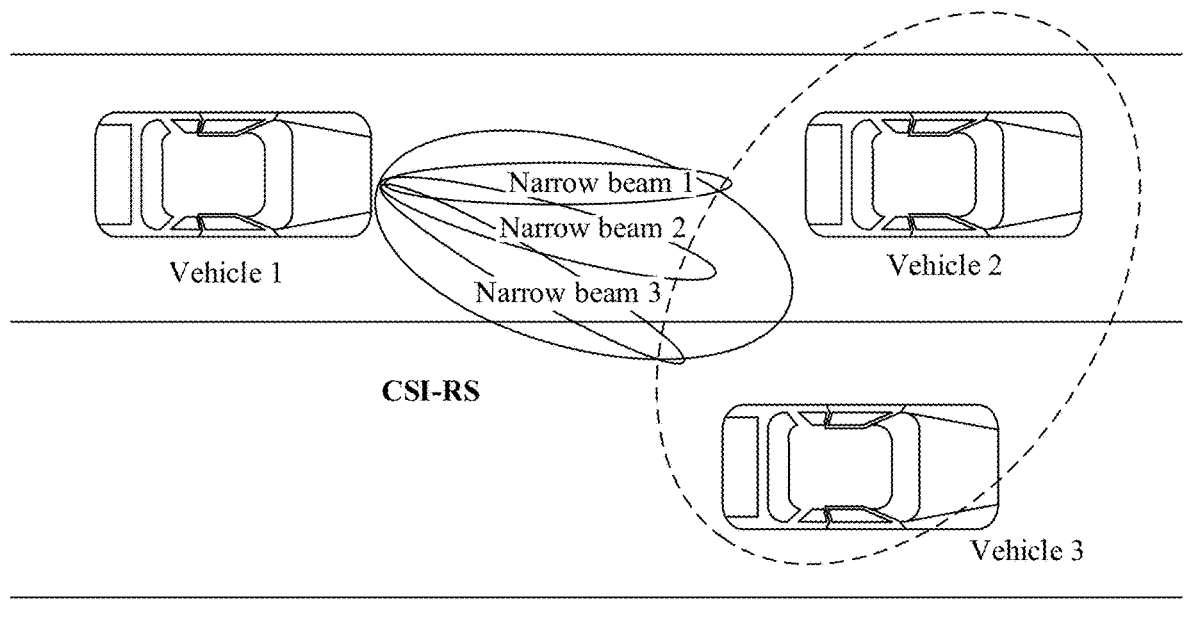
FIG. 5 is a schematic diagram of other beam training according to an embodiment of the present disclosure.
Figure 5:
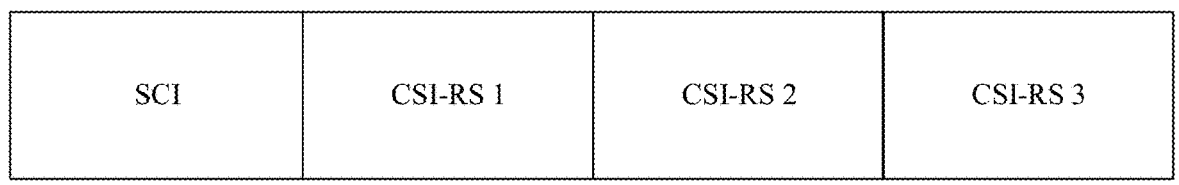

For example, as shown in FIG. 5, a vehicle 1 simultaneously sends a CSI-RS 1, a CSI-RS 2, and a CSI-RS 3 to a vehicle 2 and a vehicle 3 by using three narrow beams (a narrow beam 1, a narrow beam 2, and a narrow beam 3) in a same wide beam. The narrow beam 1 carries the CSI-RS 1, the narrow beam 2 carries the CSI-RS 2, and the narrow beam 3 carries the CSI-RS 3. The narrow beam 1 is in a direction towards the vehicle 2, and the narrow beam 2 and the narrow beam 3 are in directions deviated from the direction to the vehicle 2, so that when receiving the narrow beam 1, the narrow beam 2, and the narrow beam 3, the vehicle 2 may determine that the narrow beam 1 has highest signal strength, the corresponding CSI-RS 1 has highest signal strength, and therefore, the vehicle 2 selects the narrow beam 1 to communicate with the vehicle 1. The narrow beam 3 is in a direction towards the vehicle 3, and the narrow beam 1 and the narrow beam 2 are in directions deviated from the direction to the vehicle 3, so that when receiving the narrow beam 1, the narrow beam 2, and the narrow beam 3, the vehicle 3 may determine that the narrow beam 3 has highest signal strength, the corresponding CSI-RS 3 has highest signal strength, and therefore, the vehicle 3 selects the narrow beam 3 to communicate with the vehicle 1.

In one embodiment, the CSI-RS may be used for beam training, or may be used for channel measurement. If the received SCI includes second indication information, the second communications device may determine, based on the second indication information, whether the CSI-RS is used for channel measurement, beam training, or both channel measurement and beam training. If the CSI-RS is used for channel measurement, a rank, a channel gain, a channel direction, and the like of a channel are measured based on the CSI-RS.

Preferably, after the first communications device sends the at least one CSI-RS to the second communications device based on the SCI, this embodiment of the present disclosure further includes the following operation:

Operation S403: The second communications device sends feedback information to the first communications device, where the feedback information includes at least one of an identifier of the beam corresponding to the CSI-RS with the highest signal strength and a resource identifier of the CSI-RS with the highest signal strength.

During specific implementation, after determining the beam with the highest signal strength or the CSI-RS with the highest signal strength, the second communications device may send, to the first communications device, the feedback information including the identifier of the beam with the highest signal strength or the resource identifier of the CSI-RS with the highest signal strength. After receiving the feedback information, the first communications device selects, based on the identifier of the beam with the highest signal strength or the resource identifier of the CSI-RS with the highest signal strength, the beam with the highest signal strength from the at least one beam, to communicate with the second communications device.

In one embodiment, if the SCI includes the time offset K, the second communications device may send, based on the time offset K, the feedback information to the first communications device in the $K^{th}$ subframe after the subframe in which the CSI-RS is received, to implement proper resource scheduling.

Figure 6:
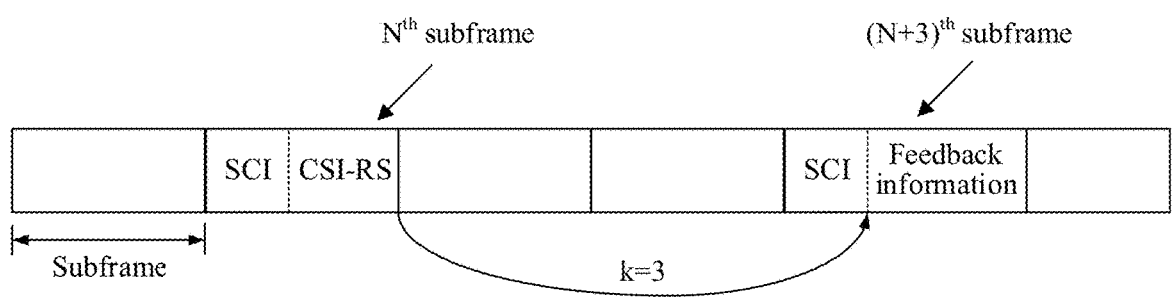
FIG. 6 is a schematic structural diagram of a V2V subframe according to an embodiment of the present disclosure.

For example, FIG. 6 is a schematic structural diagram of a V2V subframe according to an embodiment of the present disclosure. The V2V subframe includes SCI and a CSI-RS that are sent by a vehicle 1, and feedback information sent by a vehicle 2. The vehicle 1 sends the SCI and the CSI-RS in an $N^{th}$ subframe, and the vehicle 2 receives the SCI and the CSI-RS that are sent in the $N^{th}$ subframe. If a time offset K included in the SCI is 3, the vehicle 2 sends the feedback information to the vehicle 1 in a $(N+3)^{th}$ subframe.

In one embodiment, if the SCI includes first indication information, the second communications device may send, based on the first indication information, the feedback information to the first communications device on a time-frequency resource in the $K^{th}$ subframe, to better implement resource multiplexing.

Figure 7:
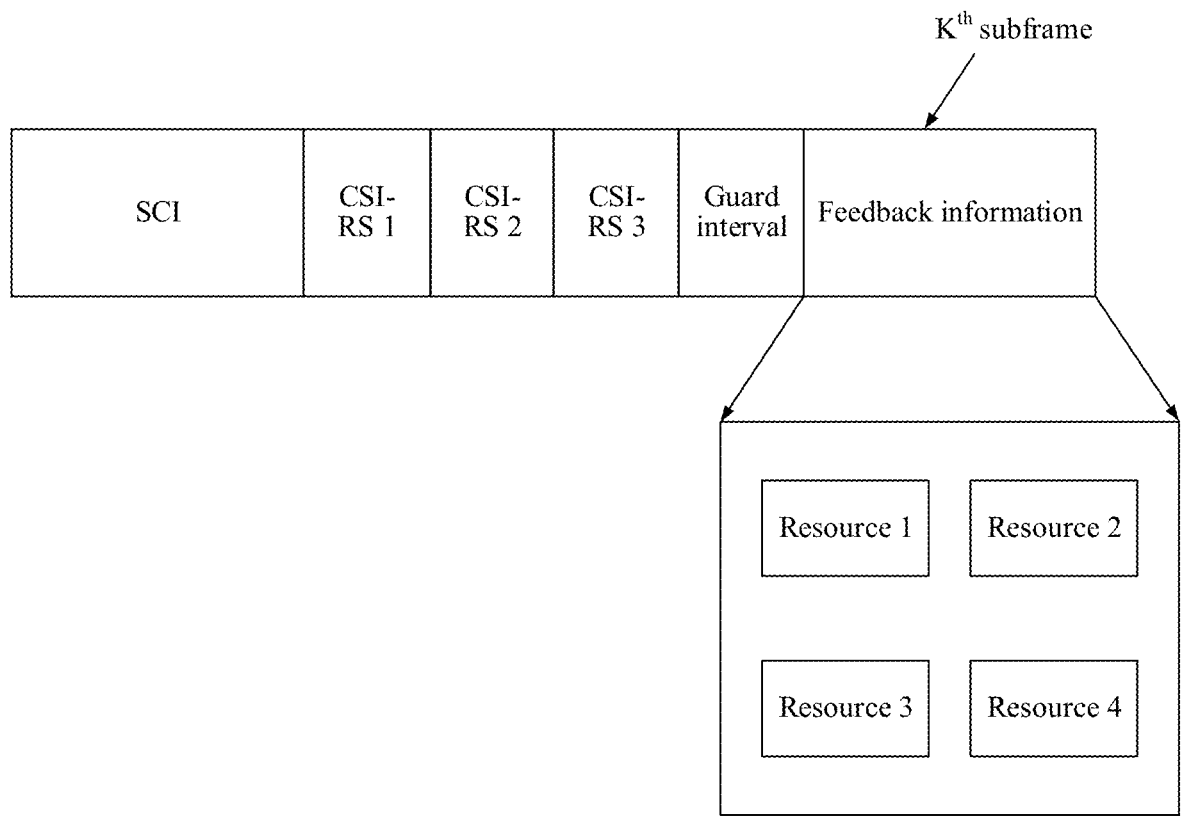
FIG. 7 is a schematic structural diagram of a V2V self-contained subframe according to an embodiment of the present disclosure.

For example, FIG. 7 is a schematic structural diagram of a V2V self-contained subframe according to an embodiment of the present disclosure. The V2V self-contained subframe includes SCI and a corresponding CSI-RS that are sent by a vehicle 1, and a plurality of time-frequency resources of a fixed size are configured in a $K^{th}$ subframe. The vehicle 1 may send the SCI including first indication information to another vehicle, and the first indication information is used to indicate a time-frequency resource used by the another vehicle to send feedback information. If a time-frequency resource index indicated in SCI received by a vehicle 2 is 1, the vehicle 2 sends feedback information to the vehicle 1 on a time-frequency resource 1 in the $K^{th}$ subframe. If a time-frequency resource index indicated in SCI received by a vehicle 3 is 2, the vehicle 3 sends feedback information to the vehicle 1 on a time-frequency resource 2 in the $K^{th}$ subframe.

In this embodiment of the present disclosure, the first communications device first sends the sidelink control information (SCI) to the second communications device. After receiving the SCI, the second communications device receives, based on the SCI, the at least one CSI-RS sent by the first communications device, and then determines, based on the CSI-RS, that the beam corresponding to the CSI-RS with the highest signal strength in the at least one CSI-RS is the beam for communication between the second communications device and the first communications device. In the method, the beam used for communication between the communications devices is determined through beam training between the communications devices. In the method, the CSI-RS used for beam training is dynamically sent based on an instruction of the SCI, and therefore, flexibility of beam training and efficiency of beam training are improved. This embodiment of the present disclosure may be applied to a 5G wireless communications system (a low-frequency scenario and a high-frequency scenario), or may be applied to a next generation wireless fidelity (Wi-Fi) network.

The foregoing describes in detail the method in the embodiments of the present disclosure. The following provides an apparatus in the embodiments of the present disclosure.

Figure 8:
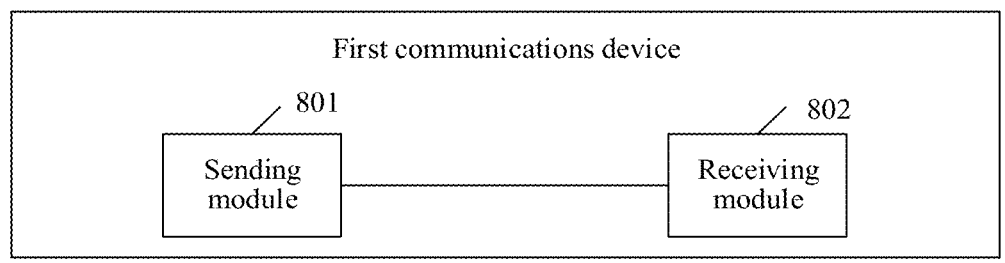
FIG. 8 is a schematic structural diagram of a first communications device according to an embodiment of the present disclosure.

FIG. 8 is a schematic structural diagram of a first communications device according to an embodiment of the present disclosure. The first communications device may include a sending module 801 and a receiving module 802. Detailed descriptions of the modules are as follows.

The sending module 801 is configured to send sidelink control information (SCI) to a second communications device, where the SCI is used to instruct the first communications device to send at least one channel state information-reference signal (CSI-RS) to the second communications device.

The sending module 801 is further configured to send the at least one CSI-RS to the second communications device based on the SCI, where the at least one CSI-RS is used by the second communications device to determine that a beam corresponding to a CSI-RS with highest signal strength in the at least one CSI-RS is a beam for communication between the second communications device and the first communications device.

In one embodiment, the receiving module 802 is configured to receive feedback information sent by the second communications device, where the feedback information includes at least one of an identifier of the beam corresponding to the CSI-RS with the highest signal strength and a resource identifier of the CSI-RS with the highest signal strength.

The SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS.

The SCI includes a time offset K, the time offset K is used to instruct the second communications device to send the feedback information in a $K^{th}$ subframe after a subframe in which the CSI-RS is received, and K is an integer greater than or equal to 0.

The SCI includes first indication information, and the first indication information is used to instruct the second communications device to send the feedback information on a time-frequency resource in the $K^{th}$ subframe.

The CSI-RS is further used for channel measurement, the SCI includes second indication information, and the second indication information is used to indicate that the CSI-RS is used for at least one of channel measurement and beam training.

The SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device.

It should be noted that, for implementation of the modules, further refer to corresponding descriptions in the method embodiment shown in FIG. 4, and the modules perform the method and a function that are performed by the first communications device in the foregoing embodiment.

Figure 9:
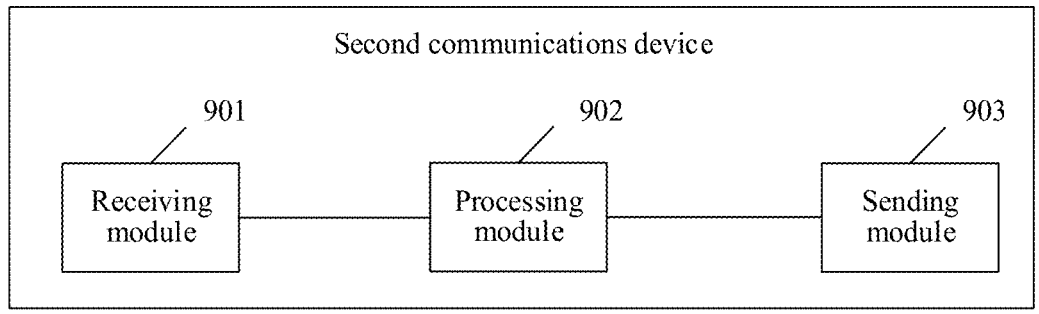
FIG. 9 is a schematic structural diagram of a second communications device according to an embodiment of the present disclosure.

FIG. 9 is a schematic structural diagram of a second communications device according to an embodiment of the present disclosure. The second communications device may include a receiving module 901, a processing module 902, and a sending module 903. Detailed descriptions of the modules are as follows.

The receiving module 901 is configured to receive sidelink control information (SCI) sent by a first communications device, where the SCI is used to instruct the first communications device to send at least one channel state information-reference signal (CSI-RS) to the second communications device.

The receiving module 901 is further configured to receive, based on the SCI, the at least one CSI-RS sent by the first communications device.

The processing module 902 is configured to determine that a beam corresponding to a CSI-RS with highest signal strength in the at least one CSI-RS is a beam for communication between the second communications device and the first communications device.

In one embodiment, the sending module 903 is configured to send feedback information to the first communications device, where the feedback information includes at least one of an identifier of the beam corresponding to the CSI-RS with the highest signal strength and a resource identifier of the CSI-RS with the highest signal strength.

The SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS.

The SCI includes a time offset K, and the sending module 903 is further configured to send, based on the time offset K, the feedback information to the first communications device in a $K^{th}$ subframe after a subframe in which the CSI-RS is received, where K is an integer greater than or equal to 0.

The SCI includes first indication information, and the sending module 903 is further configured to send, based on the first indication information, the feedback information to the first communications device on a time-frequency resource in the $K^{th}$ subframe.

The CSI-RS is further used for channel measurement, and the processing module 902 is further configured to determine, based on second indication information, that the CSI-RS is used for at least one of channel measurement and beam training.

The SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device.

It should be noted that, for implementation of the modules, further refer to corresponding descriptions in the method embodiment shown in FIG. 4, and the modules perform the method and a function that are performed by the second communications device in the foregoing embodiment.

When the first communications device or the second communications device is a chip, the processing module 902 may be a processor, the sending module 801 or the sending module 903 may be an output interface, a pin, a circuit, or the like, and the receiving module 802 or the receiving module 901 may be an input interface, a pin, a circuit, or the like. The transceiver module may be, for example, an input/output interface, a pin, or a circuit. The processing module may execute a computer executable instruction stored in a storage unit, so that the chip in the first communications device or the second communications device performs the method in FIG. 4. In one embodiment, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

Figure 10:
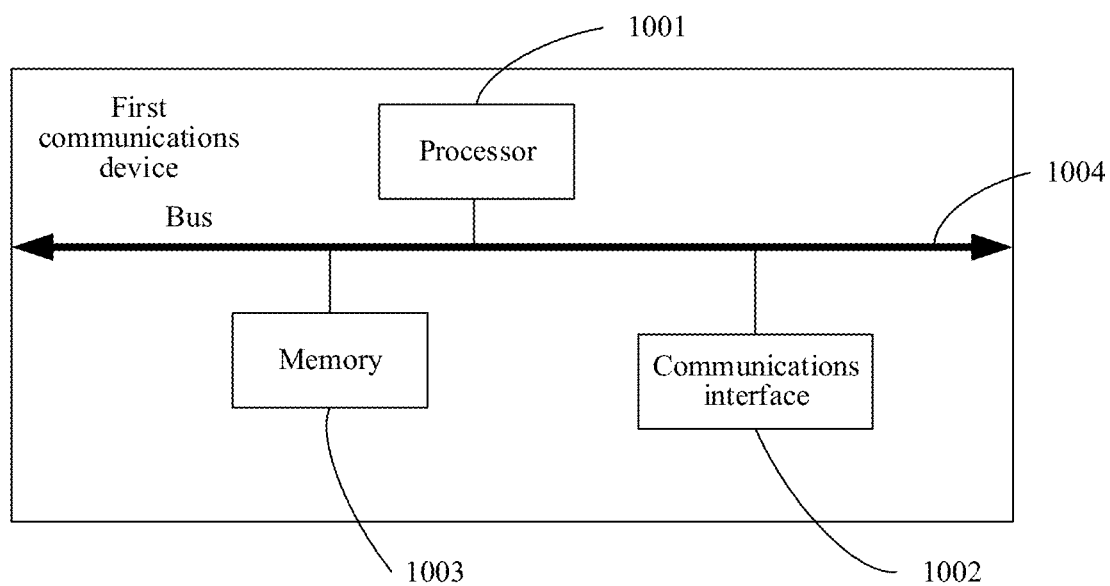
FIG. 10 is a schematic structural diagram of another first communications device according to an embodiment of the present disclosure.

FIG. 10 is a schematic structural diagram of another first communications device according to an embodiment of the present disclosure. As shown in the figure, the first communications device may include at least one processor 1001, at least one communications interface 1002, at least one memory 1003, and at least one communications bus 1004.

The processor 1001 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications bus 1004 may be a peripheral component interconnect PCI bus, an extended industry standard architecture EISA bus, or the like The bus may be classified into an address bus, a data bus, a control bus, and the like. For ease of representation, only one thick line is used to represent the bus in FIG. 10, but this does not mean that there is only one bus or only one type of bus. The communications bus 1004 is configured to implement connections and communication between these components. The communications interface 1002 in the device in this embodiment of the present disclosure is configured to perform signaling or data communication with another node device. The memory 1003 may include a volatile memory, for example, a nonvolatile dynamic random access memory (NVRAM), a phase change random access memory (PRAM), or a magnetoresistive random access memory (MRAM). The memory 1003 may further include a nonvolatile memory, for example, at least one magnetic disk storage component, an electrically erasable programmable read-only memory (EEPROM), a flash component such as a NOR flash memory or a NAND flash memory, or a semiconductor component such as a solid-state drive (SSD). In one embodiment, the memory 1003 may alternatively be at least one storage apparatus far away from the processor 1001. The memory 1003 stores a group of program code, and the processor 1001 executes a program executed in the memory 1003.

Sidelink control information (SCI) is sent to a second communications device by using the communications interface 1002, and the SCI is used to instruct the first communications device to send at least one channel state information-reference signal (CSI-RS) to the second communications device.

The at least one CSI-RS is sent to the second communications device based on the SCI by using the communications interface 1002, and the at least one CSI-RS is used by the second communications device to determine that a beam corresponding to a CSI-RS with highest signal strength in the at least one CSI-RS is a beam for communication between the second communications device and the first communications device.

In one embodiment, the processor 1001 is further configured to:

receive, by using the communications interface 1002, feedback information sent by the second communications device, where the feedback information includes at least one of an identifier of the beam corresponding to the CSI-RS with the highest signal strength and a resource identifier of the CSI-RS with the highest signal strength.

The SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS.

The SCI includes a time offset K, the time offset K is used to instruct the second communications device to send the feedback information in a $K^{th}$ subframe after a subframe in which the CSI-RS is received, and K is an integer greater than or equal to 0.

The SCI includes first indication information, and the first indication information is used to instruct the second communications device to send the feedback information on a time-frequency resource in the $K^{th}$ subframe.

The CSI-RS is further used for channel measurement, the SCI includes second indication information, and the second indication information is used to indicate that the CSI-RS is used for at least one of channel measurement and beam training.

The SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device.

Further, the processor may cooperate with the memory and the communications interface, to perform an operation of the first communications device in the foregoing embodiments of the present disclosure.

Figure 11:
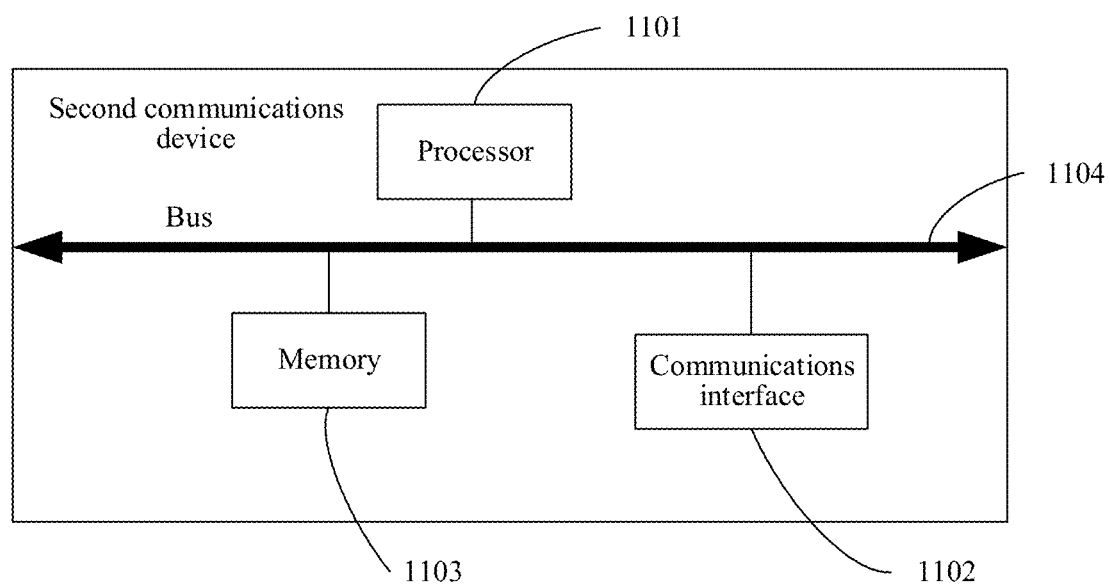
FIG. 11 is a schematic structural diagram of a second communications device according to an embodiment of the present disclosure.

FIG. 11 is a schematic structural diagram of a second communications device according to an embodiment of the present disclosure. As shown in the figure, the second communications device may include at least one processor 1101, at least one communications interface 1102, at least one memory 1103, and at least one communications bus 1104.

The processor 1101 may be processors of various types that are mentioned above. The communications bus 1104 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 11, but this does not mean that there is only one bus or only one type of bus. The communications bus 1104 is configured to implement connections and communication between these components. The communications interface 1102 in the device in this embodiment of the present disclosure is configured to perform signaling or data communication with another node device. The memory 1103 may be memories of various types that are mentioned above. In one embodiment, the memory 1103 may be at least one storage apparatus far away from the processor 1101. The memory 1103 stores a group of program code, and the processor 1101 executes a program in the memory 1103 that is executed by the foregoing communications device.

Sidelink control information (SCI) sent by a first communications device is received by using the communications interface 1102, and the SCI is used to instruct the first communications device to send at least one channel state information-reference signal (CSI-RS) to the second communications device.

The at least one CSI-RS sent by the first communications device is received based on the SCI by using the communications interface 1102.

That a beam corresponding to a CSI-RS with highest signal strength in the at least one CSI-RS is a beam for communication between the second communications device and the first communications device is determined.

In one embodiment, the processor 1101 is further configured to:

send feedback information to the first communications device by using the communications interface 1102, where the feedback information includes at least one of an identifier of the beam with the highest received signal strength and a resource identifier of the CSI-RS with the highest received signal strength.

The SCI includes at least one of a device identifier of the second communications device, a scheduling indication of the CSI-RS, and transmission information of the CSI-RS, and the transmission information of the CSI-RS includes at least one of time-frequency resource information of the CSI-RS, a resource identifier of the CSI-RS, and a scrambling identity of the CSI-RS.

The SCI includes a time offset K, and the processor 1101 is further configured to:

send, based on the time offset K, the feedback information to the first communications device in a $K^{th}$ subframe after a subframe in which the CSI-RS is received, where K is an integer greater than or equal to 0.

The SCI includes first indication information, and the processor 1101 is further configured to:

send, based on the first indication information, the feedback information to the first communications device on a time-frequency resource in the $K^{th}$ subframe.

The CSI-RS is further used for channel measurement, and the SCI includes second indication information.

In one embodiment, the processor 1101 is further configured to: determine, by the second communications device based on the second indication information, that the CSI-RS is used for at least one of channel measurement and beam training.

The SCI includes configuration information of the CSI-RS, the configuration information of the CSI-RS includes at least one of an occupied bandwidth, the scrambling identity, an antenna port, and signal density that are of the CSI-RS, and the configuration information of the CSI-RS is preconfigured by a base station and sent to the first communications device.

Further, the processor may cooperate with the memory and the communications interface, to perform an operation of the second communications device in the foregoing embodiments of the present disclosure.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of the present disclosure are further described in detail in the foregoing specific implementations. Any modification, equivalent replacement, or improvement made without departing from the spirit and principle of the present disclosure shall fall within the protection scope of the present disclosure.

What is claimed is:

1. A beam training method, wherein the method comprises:

sending, by a first communications device, sidelink control information (SCI) to a second communications device, wherein the SCI is used to instruct the first communications device to send at least one channel state information-reference signal (CSI-RS) to the second communications device, and wherein the SCI and the at least one CSI-RS are in a same subframe of a plurality of subframes; and sending, by the first communications device, the at least one CSI-RS to the second communications device based on the SCI, wherein the at least one CSI-RS is used by the second communications device to determine that a beam corresponding to a CSI-RS with a highest signal strength in the at least one CSI-RS is a beam for communication between the second communications device and the first communications device, wherein the at least one CSI-RS comprises a plurality of channel state information reference signals, and wherein the first communications device and the second communications device apply wide beam alignment in which the first communications device separately sends the plurality of channel state information reference signals to the second communications device by using a plurality of narrow beams in a same wide beam.

2. The method according to claim 1, wherein the method further comprises:

receiving, by the first communications device, feedback information sent by the second communications device, wherein the feedback information comprises at least one of an identifier of the beam corresponding to the CSI-RS with the highest signal strength or a resource identifier of the CSI-RS with the highest signal strength.

3. The method according to claim 1, wherein the SCI comprises at least one of a device identifier of the second communications device, a scheduling indication of the CSI-RS, or transmission information of the CSI-RS, and the transmission information of the CSI-RS comprises at least one of time-frequency resource information of the CSI-RS, a resource identifier of the CSI-RS, or a scrambling identity of the CSI-RS.

4. The method according to claim 2, wherein the SCI comprises a time offset K, the time offset K is used to instruct the second communications device to send the feedback information in a Kth subframe after the subframe in which the CSI-RS is received, and K is an integer greater than or equal to 0.

5. The method according to claim 4, wherein the SCI comprises first indication information, and the first indication information is used to instruct the second communications device to send the feedback information on a time-frequency resource in the Kth subframe.

6. The method according to claim 1, wherein the CSI-RS is further used for channel measurement, the SCI comprises second indication information, and the second indication information is used to indicate that the CSI-RS is used for at least one of the channel measurement and beam training.

7. The method according to claim 1, wherein the SCI comprises configuration information of the CSI-RS, the configuration information of the CSI-RS comprises at least one of an occupied bandwidth, a scrambling identity, an antenna port, or signal density that are of the CSI-RS, and the configuration information of the CSI-RS is preconfigured by a base station and sent to the first communications device.

8. A beam training method, wherein the method comprises:

receiving, by a second communications device, sidelink control information (SCI) sent by a first communications device, wherein the SCI is used to instruct the first communications device to send at least one channel state information-reference signal (CSI-RS) to the second communications device, and wherein the SCI and the at least one CSI-RS are in a same subframe of a plurality of subframes;

receiving, by the second communications device based on the SCI, the at least one CSI-RS sent by the first communications device; and determining, by the second communications device, that a beam corresponding to a CSI-RS with a highest signal strength in the at least one CSI-RS is a beam for communication between the second communications device and the first communications device, wherein the at least one CSI-RS comprises a plurality of channel state information reference signals, and wherein the first communications device and the second communications device apply wide beam alignment in which the first communications device separately sends the plurality of channel state information reference signals to the second communications device by using a plurality of narrow beams in a same wide beam.

9. The method according to claim 8, wherein the method further comprises:

sending, by the second communications device, feedback information to the first communications device, wherein the feedback information comprises at least one of an identifier of the beam corresponding to the CSI-RS with the highest signal strength or a resource identifier of the CSI-RS with the highest signal strength.

10. The method according to claim 8, wherein the SCI comprises at least one of a device identifier of the second communications device, a scheduling indication of the CSI-RS, or transmission information of the CSI-RS, and the transmission information of the CSI-RS comprises at least one of time-frequency resource information of the CSI-RS, a resource identifier of the CSI-RS, or a scrambling identity of the CSI-RS.

11. The method according to claim 9, wherein the SCI comprises a time offset K, and the sending, by the second communications device, feedback information to the first communications device comprises:

sending, by the second communications device based on the time offset K, the feedback information to the first communications device in a Kth subframe after the subframe in which the CSI-RS is received, wherein K is an integer greater than or equal to 0.

12. The method according to claim 11, wherein the SCI comprises first indication information, and the sending, by the second communications device, feedback information to the first communications device comprises:

sending, by the second communications device based on the first indication information, the feedback information to the first communications device on a time-frequency resource in the Kth subframe.

13. The method according to claim 8, wherein the CSI-RS is further used for channel measurement, the SCI comprises second indication information, and the method further comprises:

determining, by the second communications device based on the second indication information, that the CSI-RS is used for at least one of the channel measurement and beam training.

14. The method according to claim 8, wherein the SCI comprises configuration information of the CSI-RS, the configuration information of the CSI-RS comprises at least one of an occupied bandwidth, a scrambling identity, an antenna port, or signal density that are of the CSI-RS, and the configuration information of the CSI-RS is preconfigured by a base station and sent to the first communications device.

15. A channel measurement method, wherein the method comprises:

sending, by a first communications device, sidelink control information (SCI) to a second communications device, wherein the SCI is used to instruct the first communications device to send at least one channel state information-reference signal (CSI-RS) to the second communications device, and wherein the SCI and the at least one CSI-RS are in a same subframe of a plurality of subframes; and sending, by the first communications device, the at least one CSI-RS to the second communications device based on the SCI, wherein the at least one CSI-RS is used by the second communications device to perform channel measurement, wherein the at least one CSI-RS comprises a plurality of channel state information reference signals, and wherein the first communications device and the second communications device apply wide beam alignment in which the first communications device separately sends the plurality of channel state information reference signals to the second communications device by using a plurality of narrow beams in a same wide beam.

16. The method according to claim 15, wherein the SCI comprises at least one of a device identifier of the second communications device, a scheduling indication of the CSI-RS, or transmission information of the CSI-RS, and the transmission information of the CSI-RS comprises at least one of time-frequency resource information of the CSI-RS, a resource identifier of the CSI-RS, or a scrambling identity of the CSI-RS.

17. The method according to claim 15, wherein the SCI comprises a time offset K, the time offset K is used to instruct the second communications device to send feedback information in a Kth subframe after the subframe in which the CSI-RS is received, and K is an integer greater than or equal to 0.

18. The method according to claim 17, wherein the SCI comprises first indication information, and the first indication information is used to instruct the second communications device to send the feedback information on a time-frequency resource in the Kth subframe.

* * * * *